United States Patent
Kandemir et al.

(10) Patent No.: US 10,896,351 B2
(45) Date of Patent: Jan. 19, 2021

(54) ACTIVE MACHINE LEARNING FOR TRAINING AN EVENT CLASSIFICATION

(71) Applicant: Carl Zeiss Industrielle Messtechnik GmbH, Oberkochen (DE)

(72) Inventors: Melih Kandemir, Cekmekoy (TR); Fred Hamprecht, Heidelberg (DE); Christian Wojek, Aalen (DE); Ute Schmidt, Amoeneburg (DE)

(73) Assignee: Carl Zeiss Industrielle Messtechnik GmbH, Oberkochen (DE)

(*) Notice: Subject to any disclaimer, the term of this patent is extended or adjusted under 35 U.S.C. 154(b) by 185 days.

(21) Appl. No.: 15/904,345

(22) Filed: Feb. 24, 2018

(65) Prior Publication Data

US 2018/0189610 A1    Jul. 5, 2018

Related U.S. Application Data

(63) Continuation of application No. PCT/EP2016/069914, filed on Aug. 23, 2016.

(30) Foreign Application Priority Data

Aug. 24, 2015 (DE) .......................... 10 2015 114 015

(51) Int. Cl.
  *G06K 9/62* (2006.01)

(52) U.S. Cl.
  CPC ......... *G06K 9/6263* (2013.01); *G06K 9/6256* (2013.01); *G06K 9/6278* (2013.01); *G06K 9/6284* (2013.01)

(58) Field of Classification Search
  None
  See application file for complete search history.

(56) References Cited

U.S. PATENT DOCUMENTS

| 7,864,980 B2 * | 1/2011 | Evans | G06K 9/00771 348/154 |
| 2007/0063548 A1 * | 3/2007 | Eipper | G06K 9/6284 296/203.01 |
| 2012/0008868 A1 * | 1/2012 | Tsao | G06K 9/00624 382/224 |

(Continued)

FOREIGN PATENT DOCUMENTS

WO    2009133383 A1    11/2009

OTHER PUBLICATIONS

B. Schölkopf et al., "Estimating the support of a high-dimensional distribution" In: Neural Computation 13, pp. 1443-1471 (2001).

(Continued)

*Primary Examiner* — Bernard Krasnic
(74) *Attorney, Agent, or Firm* — Falk Ewers; Ewers IP Law PLLC

(57) ABSTRACT

An event classification is trained by machine learning. An anomaly detection for detecting events in an image data set is thereby performed. Based on the performance of the anomaly detection, a model assumption of the event classification is determined. An image data set may include a plurality of images, and each image may include an array of pixels. Further, an image data set may include volume data and/or a time sequence of images and in this way represent a video sequence.

19 Claims, 6 Drawing Sheets

(56) References Cited

U.S. PATENT DOCUMENTS

| | | | |
|---|---|---|---|
| 2012/0284791 A1* | 11/2012 | Miller | G06F 21/554 726/22 |
| 2012/0294511 A1* | 11/2012 | Datta | G06K 9/00771 382/155 |
| 2014/0270347 A1 | 9/2014 | Xu et al. | |
| 2016/0275628 A1* | 9/2016 | Mishra | G06Q 50/04 |
| 2017/0103264 A1* | 4/2017 | Javan Roshtkhari | G06K 9/00718 |

OTHER PUBLICATIONS

C. Lu et al., "Abnormal event detection at 150 fps in Matlab", In: International Conference on Computer Vision, pp. 2720-2727 (2013).
F. T. Liu et al., "Isolation Forest", In: IEEE ICDM, pp. 413-422 (2008).
K. Fukushima, "Neocognitron: A Hierarchical Neural Network Capable of Visual Pattern Recognition", In: Neural Networks 1, pages 119-130 (1998).
K.-B. Duan and S.S. Keerthi, "Which is the Best Multiclass SVM Method? An Empirical Study", In: Lecture Notes in Computer Science 3541, pp. 278-285 (2005).
L. Breiman, "Random Forests", In: Machine Learning 45, pp. 5-32 (2001).
M. A. Kramer, "Autoassociative Neural Networks", In: Computers them. Engng. 16, pp. 313-328 (1992).
M. Kaakinen et al., "Automatic detection and analysis of cell motility in phase-contrast timelapse images using a combination of maximally stable extremal regions and kalman filter approaches", In: Journal of Microscopy 253, pp. 65-67 (2014).
M. Kandemir et al., "Event Detection by Feature Unpredictability in Phase-Contrast Videos of Cell Cultures", In: Medical Image Computing and Computer-Assisted Intervention, 8674, pp. 154-161 (2014).
N. Dalai und B. Triggs, "Histograms of oriented gradients for human detection", In: Computer Vision and Pattern Recognition CVPR 1, pp. 886-893 (2005).
P. Bodesheim et al., "Kernel null space methods for novelty detection", In: International Conference on Computer Vision and Pattern Recognition, pp. 3374-3381 (2013).
S. Huh et al. "Apoptosis detection for adherent cell populations in time-lapse phase-contrast microscopy images", In: Medical Image Computing and Computer-Assisted Intervention, Springer, pp. 331-339 (2012).
S. Huh et al., "Automated mitosis detection of stem cell populations in phase-contrast microscopy images", In: Trans. Medical Imaging 30, pp. 586-596 (2011).
S. Ravikumar, et al., "Machine learning approach for automated visual inspection of machine components", In: Expert Systems with Applications, 38, pp. 3260-3266 (2011).
T. Cover and P. Hart, "Nearest neighbor pattern classification", In: IEEE Trans. Information Theory, pp. 21-27 (1967).
T. Ojala T et al., "Multiresolution gray-scale and rotation invariant texture classification with Local Binary Patterns", In: IEEE Transactions on Pattern Analysis and Machine Intelligence 24, pp. 971-987 (2004).
T.V. Nguyen and E. V. Nobilla, "Collaborative Multi-output Gaussian Process, in Uncertainity", In: Artificial Intelligence, p. 3 (2014).
Y. Freund, R. Schapire, "A decision theoretic generalization of on-line learning and an application to boosting" In: J. Comp. Syst. Science 55, pp. 119-139 (1997).
C.E. Rasmussen et al., "Gaussian Processes for Machine Learning", the MIT Press, 2006.
A. Kapoor et al., "Active Learning with Gaussian Processes for Object Categorization", Computer Vision, 2007. ICCV 2007. IEEE 11th International Conference ON, IEEE, PI, Oct. 1, 2007; pp. 1-8.
S. Rajan al., "An Active Learning Approach to Hyperspectral Data Classification", IEEE Transactions on Geoscience and Remote Sensing, IEEE Service Center, Piscataway, NJ, US, vol. 46, No. 4, Apr. 1, 2008; pp. 1231-1242.
V. Chandola et al., "Anomaly detection: A survey.", In: ACM Computing Surveys, 41, Jul. 2009; 3; Article 15; pp. 1-58.
I. Tziakos et al., "Local Abnormality Detection in Video Using Subspace Learning", In: Advanced Video and Signal Based Surveillance (AVSS), 2010, 7th IEEE International Conference; pp. 519-525.
S. Huh et al., "Detection of mitosis within a stem cell population of high cell confluence in phase-contrast microscopy images", Computer Vision and Pattern Recognition (CVPR), 2011, IEEE Conference, IEEE Jun. 20, 2011; pp. 1033-1040.
T. Nguyen et al., "Collaborative Multi-output Gaussian Processes", Published in: Proceeding UAI'14 Proceedings of the 30th Conference on Uncertainty in Artificial Intelligence; Quebec, Canada, Jul. 2014; pp. 643-652.
K. Melih et al., "Event Detection by Feature Unpredictability in Phase-Contrast Videos of Cell Cultures", Sep. 14, 2014, Network and Parallel Computing; [Lecture Notes in Computer Science; Leet. Notes Computer], Springer International Publishing, Cham; pp. 154-161.
International Search Report of the European Patent Office in PCT/EP2016/069914 (from which this application claims priority) dated Nov. 22, 2016.

* cited by examiner

ACTIVE MACHINE LEARNING FOR TRAINING AN EVENT CLASSIFICATION

CROSS REFERENCE TO RELATED APPLICATIONS

This application is a continuation application of international patent application PCT/EP2016/069914, filed Aug. 23, 2016, designating the United States and claiming priority to German application 10 2015 114 015.2, filed Aug. 24, 2015, and the entire content of both applications is incorporated herein by reference.

TECHNICAL FIELD

Various aspects concern a method for training an event classification by machine learning and a device designed for training an event classification by machine learning. In particular, the various aspects concern techniques for determining a model assumption of the event classification based on an anomaly detection.

BACKGROUND

For the automatic detection of events in images of an image data set, techniques of machine learning are known. The automated detection of events allows large image data sets to be processed by a machine. Applications may be, for example, the analysis of experimental data, microscopy of biological systems, such as cell cultures, the analysis of image databases (big data and data mining), industrial process control, access monitoring in buildings, etc.

Examples of corresponding algorithms are anomaly detection (or novelty detection), which detects the presence or absence of events, and event classification (event classifier), which decides between different types of events. Anomaly detection is sometimes also referred to as novelty detection.

Typically, it may be necessary for corresponding algorithms to be suitably trained to achieve a great accuracy of detection of events. Various approaches to training are known: In the case of "supervised learning," it may for example be necessary that a user provides the system with "ground truths," that is to say, the user manually annotates the presence or absence or the type of events, for example, based on a training data set. For this purpose, manual interaction of the user may be necessary for training the anomaly detection or event classification. In various variants, it may be necessary that the user marks the exact position or the spatial/temporal extent of an event in an image; such techniques are often referred to as (fully) supervised learning.

Supervised learning may be extensive and demanding. Supervised learning may mean a comparatively great expenditure of time; in particular, to achieve a great accuracy of detection of events, it may be necessary that a large number of images are manually annotated by the user for training. Since specialist experts are typically required as users for supervised learning to provide the correct ground truths, corresponding training may also be particularly cost-intensive.

SUMMARY

There is therefore a need for improved techniques for training event classification by machine learning. In particular, there is a need for techniques that require a low level of manual interaction by the user for training the event classification, and at the same time provide a great accuracy of detection of events.

According to one aspect, the present invention provides a method for training event classification by machine learning. The method includes performing anomaly detection for detecting events in an image data set. The method also includes determining a model assumption of the event classification based on the performance of the anomaly detection.

The image data set may for example include a plurality of images. Each image may for example include an array of pixels. It would for example be possible that the image data set includes volume data and/or includes a time sequence of images and in this way represents a video sequence. As an alternative or in addition, an image data set may include multiple channels from different spectra or different contrast methods. Depending on the content of the various images, a wide variety of events can be detected. For example, it is possible that the image data set of a microscope is obtained, and a cell culture is depicted as a function of time; in this context, it is possible that an event from the following group is selected: Mitosis of a cell; and apoptosis of a cell. For example, the image data set of an optical phase-contrast microscope may be obtained. In the area of industrial process control, a defect, i.e., a deviation of a test piece from the normal state or range of a specification, may also be regarded as an event to be detected. This may concern for example defects such as voids, scratches, bubbles or other cosmetic defects. The data set may, for example, be recorded by a computed tomography (CT) technique that uses a CT scanner or a phase-shifting technique, i.e., by 3D detectors.

By performing the anomaly detection, it is therefore possible to determine the a priori distribution of the event classification as a model assumption; the model assumption of the event classification may therefore designate the ground truth, which is taken into account when performing the event classification during the detection and classification. This model assumption may therefore be considered, for example, as a valid set of mappings from the space of the image data set into the result space, the result space including, for example, different types of events as elements. Techniques of Bayesian statistics may be used for determining the model assumption, see for example C. E. Rasmussen, K. I. Williams, Gaussian Processes for Machine Learning, MIT Press (2006). In particular, it is possible by performing the anomaly detection to reduce the uncertainty or variance of the event classification, at least in the area of events detected by the anomaly detection, and thereby to achieve overall a better accuracy of detection of the event classification.

Generally, a wide variety of algorithms can be used for anomaly detection. For example, the anomaly detection may be selected from the following group: (I) Isolation Forest, see for example F. T. Liu et al., Isolation Forest, in IEEE ICDM (2008) 413-422; (II) Sparse Coding, see for example C. Lu et al., Abnormal event detection at 150 fps in Matlab, in International Conference on Computer Vision (2013) 2720-2727; (III) Neural Networks, see M. A. Kramer, Autoassociative Neural Networks, in Computers them. Engng. 16 (1992) 313-328; (IV) Nearest Neighbor, see for example T. Cover and P. Hart, Nearest neighbor pattern classification, in IEEE Trans. Information Theory (1967) 21-27; (V) Collaborative Multi-Output Gaussian Process, see T. V. Nguyen and E. V. Nobilla, Collaborative Multi-output Gaussian Process, in Uncertainity in Artificial Intelligence (2014) 3; (VI) Support Vector Machine, see for example B. Scholkopf et al., Estimating the support of a high-dimensional distribution in Neural Computation 13 (2001) 1443-1471; and (VII) Kernel Null Space Technique, see for example P. Bodesheim et al., Kernel null space methods for novelty detection, in International Conference on Computer Vision and Pattern Recognition (2013) 3374-3381.

A wide variety of algorithms can also be used for event classification. For example, the event classification may be selected from the following group: (I) Multiclass SVM, see for example K.-B. Duan and S. S. Keerthi, Which is the Best Multiclass SVM Method? An Empirical Study, in Lecture Notes in Computer Science 3541 (2005) 278-285; (II) Multiclass Boosting, see for example Y. Freund, R. Schapire, A decision theoretic generalization of on-line learning and an application to boosting in J. Comp. Syst. Science 55 (1997) 119-139; (III) Neural Networks, see K. Fukushima, Neocognitron: A Hierarchical Neural Network Capable of Visual Pattern Recognition, in Neural Networks 1 (1998) 119-130; (IV) Gaussian Process, see for example C. E. Rasmussen, K. I. Williams, Gaussian Processes for Machine Learning, in MIT Press (2006); (V) Nearest Neighbor, see for example T. Cover and P. Hart, Nearest neighbor pattern classification, IEEE Trans. Information Theory; and (VI) Random Forest, see for example L. Breiman, Random Forests, in Machine Learning 45 (2001) 5-32.

It is, for example, possible that the method also includes: Performing the event classification for classifying events in a further image data set based on the determined model assumption of the event classification. The image data set and the further image data set may at least partially overlap or else be disjoint.

The techniques described above make it possible to reduce the effort required for manual annotation in comparison with reference implementations, since an approximate presorting can be achieved by the anomaly detection. By first performing the anomaly detection, efficient and exact training of the event classification can be achieved.

In this respect, it may be desirable that the performance of the anomaly detection already takes place with a great accuracy of detection. In a simple scenario, it is possible that the model assumption is prescribed to the anomaly detection; for example, a standard value for the model assumption of the anomaly detection could be chosen. In other scenarios, it is also possible that the model assumption of the anomaly detection is determined in a learning step. Generally, a wide variety of techniques for training anomaly detection are conceivable. For example, the anomaly detection can be automatically trained by an autoregression technique, i.e., a weakly supervised or unsupervised learning step can be performed. See for example M. Kandemir et al., "Event Detection by Feature Unpredictability in Phase-Contrast Videos of Cell Cultures," in Medical Image Computing and Computer-Assisted Intervention, 8674 (2014) 154-161. In this context, it is for example possible that the method also includes: performing an unsupervised or weakly supervised learning step based on a training image data set for determining the model assumption of the anomaly detection. The training image data set may have no events. As an alternative or in addition, it is also possible to train the anomaly detection manually.

The images of the image data set are for example characterized by specific image features. The image features include for example the pixel values of individual pixels of the images of the image data set. The image features may also designate processed image properties of the image. Both for anomaly detection and for event classification, statistics may first be calculated with respect to the pixels that characterize more specifically certain image properties, such as, for example, the form, texture, dynamic range, and contrast, etc., as image features. These may be for example histograms of oriented gradients, see N. Dalal and B. Triggs, Histograms of oriented gradients for human detection, in Computer Vision and Pattern Recognition CVPR 1 (2005) 886-893. For example, a texture can also be characterized by differences between pairs of pixels, see T. Ojala T et al., Multiresolution gray-scale and rotation invariant texture classification with Local Binary Patterns, in IEEE Transactions on Pattern Analysis and Machine Intelligence 24 (2004) 971-987. The use of processed image properties as image features often delivers more robust results in comparison with the use of the unprocessed raw data in the form of the pixel values as image features.

The model assumption of the anomaly detection may—in a way corresponding to the model assumption of the event classification—designate the ground truth, that is taken into account when performing the anomaly detection during the detection of events. Comments corresponding to those already made above with reference to the model assumption of the event classification apply. A greater accuracy in detecting events in the image data set can be achieved by training the anomaly detection.

Determining the model assumption of the event classification may for example also include performing a supervised learning step by a user interface. The supervised learning step may be based on a candidate subset of the image data set.

By training the event classification, a greater accuracy can be achieved when classifying the events. Basing the supervised learning step on the performance of the anomaly detection allows a particularly steep learning curve to be achieved, i.e., a comparatively great accuracy of the event classification can be achieved with comparatively little effort for the manual annotation.

For example, the performance of a supervised learning step may include the manual annotation (labeling) of images of the candidate subset of the image data set by a user. The user can therefore determine, for example, whether or not an event is present in an image, or which type of event is present. It is in this case optionally possible for the user to indicate which event is present (annotation of the event class). It is also possible that the annotation of the event class is performed automatically. It is in this case possible, for example, that the supervised learning step is performed directly based on images of the candidate subset. It is, however, also possible that the images of the candidate subset are processed in the course of performing the supervised learning step. On the assumption that the common property of each event is an abrupt change as a function of time, a difference in intensity of consecutive images (difference image) of the candidate subset can be taken into account, for example, for the manual annotation. An event candidate may be present, for example, if there is a sufficiently large contiguous component in the difference image. As an alternative or in addition, a binary conversion could be performed; for this purpose, a specific threshold value could be considered for example as a separating line between the value ONE and the value ZERO, for example 25% of the brightest pixel value. As an alternative or in addition, a background of the various images of the candidate subset may be removed. This may be performed, for example, by trimming the histogram and/or by a spatial domain filter, which removes small contiguous regions in the respective image. As an alternative or in addition, further filtering operations may be used, such as dilation and/or erosion and/or filling of gaps. By such preconditioning of the images of the candidate subset in the course of the supervised learning step, the search space for the learning step can be greatly reduced. As a result, the effort involved in performing the supervised learning step can be reduced.

For example, the candidate subset can be smaller than the image data set. This allows the effort required for manual annotation to be reduced further. In addition, it may typically be desirable to determine the candidate subset in such a way that a particularly steep learning curve is achieved with limited effort for the manual annotation to increase the accuracy of the event classification by correspondingly determining the model assumption. That is, because it may in this way be possible that, even with a comparatively small number of annotated images, the accuracy in the detection of events in the image data set when performing the anomaly detection is comparatively great, for example, in comparison with reference implementations according to S. Huh and M. Chen, "Detection of mitosis within a stem cell population of high cell confluence in phase-contrast microscopy images," in Intl. Conf. Comp. Vision and Pattern Recognition (2011) 1033-1040, or S. Huh et al., "Automated mitosis detection of stem cell populations in phase-contrast microscopy images," in Trans. Medical Imaging, 30 (2011) 586-596, or S. Huh et al. "Apoptosis detection for adherent cell populations in time-lapse phase-contrast microscopy images," in Medical Image Computing and Computer-Assisted Intervention, Springer (2012), 331-339. In comparison with unsupervised techniques, a greater accuracy can be achieved in the detection, cf. for example M. Kandemir et al., "Event Detection by Feature Unpredictability in Phase-Contrast Videos of Cell Cultures," in Medical Image Computing and Computer-Assisted Intervention, 8674 (2014) 154-161.

Generally, a wide variety of metrics can be used to detect an event based on a comparison between the prediction of the anomaly detection and the actual images of the candidate subset. Correspondingly, the metric can be used for deciding whether a specific image is assigned to the candidate subset. The metric may deliver a corresponding result, the value of which is indicative of the probability that an event is present. Depending on the metric used, a more sensitive or more robust detection of events is possible.

For example, it is possible that the method also includes determining the candidate subset of the image data set based on a difference between a mean value of a prediction of the anomaly detection for image features of a specific image and the image features of the specific image.

Apart from the mean value, other variables may also be considered in the respective metric when detecting an event. For example, a measure of the similarity between a distribution of the prediction of the anomaly detection for image features of a specific image and the distribution of the image features of the specific image itself can be considered. Such a measure is for example the Kullback-Leibler divergence and/or a difference in the variances of the distributions. For example, the method can therefore also include determining the candidate subset of the image data set based on the Kullback-Leibler divergence between a prediction of the anomaly detection for image features of a specific image and the image features of the specific image.

The Kullback-Leibler divergence may, for example, be a measure of the surprise, i.e., how much the prediction of the anomaly detection for image features of the image deviates in comparison with the actually observed image features of the image.

Depending on the metric used for detecting events by the anomaly detection, on the one hand an accuracy when detecting the events may be comparatively high, on the other hand the required computing effort may be comparatively high. For example, it may be desirable during an on-line detection of events with low latencies to make the required computing effort comparatively small.

In various examples, the determination of the candidate subset may be performed strictly deterministically, for example based on metrics which, as described above, are based on the mean value and/or the Kullback-Leibler divergence of the prediction of the image or of the image itself. For example, it is possible to assign to the candidate subset those images that achieve the greatest or smallest results in the course of the chosen metric. It is also possible to assign alternately to the candidate subset images that achieve great and small results in the chosen metric. In this way, it may be possible to take into account both extremal regions of the result space of the metric when determining the candidate subset, and consequently when training the event classification.

It is, however, also possible as an alternative or in addition to the aforementioned metric, to take into consideration a random component for determining the candidate subset. For example, the method may also include determining the candidate subset of the image data set based on a method of drawing lots, which assigns a probability to each image of the image data set. The probability may in this case be chosen, for example, depending on the result of the anomaly detection.

The method of drawing lots may, for example, correspond to the random selection of a specific image from the set of the image data set based on the assigned probability. It is, for example, possible that the probability of each image of the image data set is determined based on the result of the aforementioned metric.

Using the method of drawing lots can achieve the effect that the result space of the metric is considered comparatively extensively when determining the candidate subset, and consequently when training the event classification.

For example, the method can also include for each image of the image data set determining the corresponding assigned probability of the method of drawing lots based on at least one element that is selected from the following group: a difference between a mean value of a prediction of the anomaly detection for image features of the corresponding image and the image features of the corresponding image, and a Kullback-Leibler divergence between a prediction of the anomaly detection for image features of the corresponding image and the image features of the corresponding image.

For example, such images of the image data set that have a greater (smaller) difference between the mean value and/or that have a greater (smaller) Kullback-Leibler divergence of the prediction of the anomaly detection for image features of the corresponding image and the image features of the corresponding image can be assigned a greater (smaller) probability in the method of drawing lots. In such a way, it can be achieved that such images that include an event with a particularly great probability (event candidate) are included in the candidate subset with a comparatively greater probability and are the subject of the supervised learning step of the event classification.

By such techniques, a particularly steep learning curve can be achieved. This is the case because it is not just strictly deterministic. For example, such images that represent an event with a high degree of certainty are allocated to the candidate subset for the manual annotation—whereby the candidate subset is dominated by the positive result group. Rather, a wide variety of different regions of the result space of the anomaly detection are taken into account in the course of the supervised learning step. The stochastic nature of the selection allows a good representation of the various regions of the result space to be achieved.

In principle, it is possible that the candidate subset remains unchanged over the entire duration of the supervised learning step. For example, in this context, the method can also include a statistical determination of the candidate subset before the supervised learning step. This means in other words that it is possible to select the images of the candidate subset from the image data set and to subsequently perform the supervised learning step based on the resulting statistical selection.

In a further example, it is also possible that the method includes iterative adaptation of the candidate subset during the supervised learning step. For example, an adaptation of the candidate subset may be performed in each case after a certain number of manual annotations. For this purpose, it is possible, for example, to take into account a model assumption of the anomaly detection renewed in a way corresponding to the manual annotation already performed. Subsequently, the candidate subset can be determined either deterministically or at least partly randomly, for example, based on the method of drawing lots described above. It is therefore possible in various implementations that the model assumption of the anomaly detection is adapted or refined based on the supervised learning step. For example, the model assumption of the anomaly detection may be changed and improved during the supervised learning step, so that the candidate subset can be adapted according to the improved model assumption of the anomaly detection. Such a technique can bring about a comparatively great accuracy and steep learning curve. At the same time, the required computing effort may be comparatively high.

A wide variety of techniques for the manual annotation during the supervised learning step are conceivable. For example, the performance of the supervised learning step may include sequentially outputting by the user interface the images of the candidate subset of the image data set, and for each image of the candidate subset of the image data set, inquiring by the user interface whether there is an event in the corresponding image.

Optionally, it is possible that it is inquired to which class or to which type an event belongs. In this way, the event classification can be trained particularly exactly.

For example, the user interface may be a screen, a keyboard, a mouse and/or a voice interface.

In various exemplary embodiments, the sequential outputting of the images of the candidate subset of the image data set may include for at least some of the images of the candidate subset of the image data set, marking an event candidate in the output of the respective image.

The marking of the event candidate may be performed by various ways of graphic highlighting. For example, the event candidate can be shown enlarged in the image and/or with colored highlighting and/or with a frame, etc.

Marking the event candidate in the output of the respective image—i.e., the position and point in time of the event are known at least approximately from the anomaly detection—allows a particularly quick manual annotation to be performed. This makes it possible that a greater number of images of the candidate subset are annotated within a specific period of time. This in turn allows a greater accuracy in the determination of the model assumption of the event classification result overall, since more images can be annotated by the user.

By the marking of the event candidate in the output of the respective image, it can also be achieved that errors in the manual annotation are reduced. The user can be directed specifically to that region of the corresponding image that is of particularly great relevance for the determination of the model assumption of the anomaly detection.

In an exemplary embodiment, the inquiry as to whether an event is present can be a yes/no inquiry. In this way, the user can be relieved of the task of establishing a spatial extent of the event in the corresponding image of the candidate subset. As a result, the manual annotation can be performed particularly quickly, whereby the determination of the model assumption of the event classification can be performed particularly exactly.

For example, the sequential outputting of the images of the candidate subset of the image data set can take place in a random sequence. In scenarios in which the candidate subset is iteratively adapted during the supervised learning step of the event classification, a particularly steep learning curve can be achieved.

It is, for example, possible that an accuracy or an error of the event classification is estimated based on the images already annotated. Then, the achievement of a prescribed accuracy threshold value can be used as a criterion for aborting the manual annotation. As a result, a period of time required for the manual learning step can in turn be reduced. An example of a technique that can be used for estimating the accuracy of the event classification is "cross-validation." Cross-validation can operate reliably in particular whenever images from the entire range of the image data set are included in the candidate subset and are manually annotated, as is the case for example by the method of drawing lots described above, given a suitable choice of the probabilities and the sequence with which the images of the candidate subset are output.

In other examples, the sequential outputting of the images of the candidate subset of the image data set may take place in a prescribed sequence. The sequence may be determined, for example, by the result of the metric which is determined based on the performance of the anomaly detection. For example, the method can also include determining the sequence with which the sequential outputting of the images of the candidate subset of the image data set takes place based on elements that are selected from the following group: a difference between a mean value of a prediction of the anomaly detection for image features of a specific image and the image features of the specific image and a Kullback-Leibler divergence between a prediction of the anomaly detection for image features of a specific image and the image features of the specific image.

In this way, it can be achieved that images that are particularly important for improving accuracy, are specifically manually annotated. As a result, a particularly steep learning curve can be achieved.

According to an aspect of the invention, a device is provided which is configured to train an event classification by machine learning. The device includes a memory, which is configured to store an image data set. The device also includes a processor, which is configured to perform an anomaly detection for detecting events in the image data set. The processor is also configured to determine a model assumption of the event classification based on the performance of the anomaly detection.

The device can also include a phase-contrast microscope. The phase-contrast microscope can be configured to capture the image data set and transfer it to the memory.

The device is configured to carry out the method for training an event classification by machine learning according to a further aspect of the present invention.

For a device according to this aspect of the invention, effects can be achieved that are comparable to the effects that can be achieved for the method for training an event classification by machine learning according to a further aspect of the present invention.

According to a further aspect, a computer program product is provided. The computer program product includes control data, which can be executed by a processor. Execution of the control data by the processor has the effect that the processor carries out a method which includes the following steps: Performing an anomaly detection for detecting events in an image data set, and, based on the performance of the anomaly detection, determining a model assumption of the event classification.

The features set out above and features that are described below may be used not only in the corresponding combinations explicitly described, but also in further combinations or in isolation, without departing from the scope of protection of the present invention.

BRIEF DESCRIPTION OF THE DRAWINGS

The invention will now be described with reference to the drawings wherein.

DESCRIPTION OF EXEMPLARY EMBODIMENTS

Figure 1:
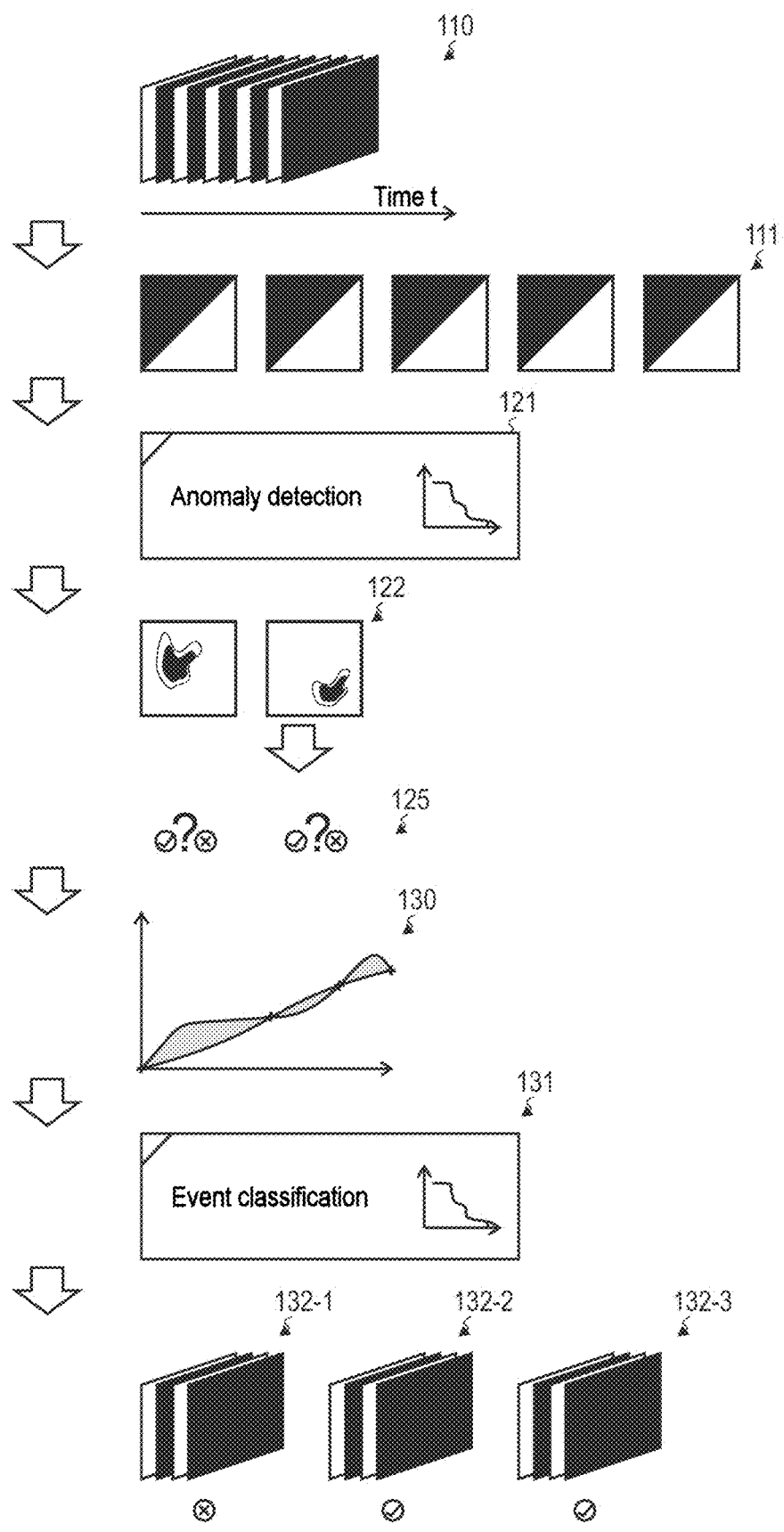
FIG. 1 schematically illustrates the workflow for interactive event detection and event classification according to exemplary embodiments of the present invention, the workflow including weakly supervised learning based on a previously performed anomaly detection and subsequently performed event classification.

The present invention is now explained in greater detail based on exemplary embodiments with reference to the drawings. In the figures, the same reference signs denote elements that are the same or similar. The figures are schematic representations of different exemplary embodiments of the invention. Elements depicted in the figures are not necessarily depicted true to scale. Rather, the different elements illustrated in the figures are reproduced in such a way that their function and general purpose become comprehensible to a person skilled in the art. Connections and couplings between functional units and elements as depicted in the figures may also be implemented as an indirect connection or coupling. A connection or coupling may be implemented in a wired or wireless manner. Functional units may be implemented as hardware, software or a combination of hardware and software.

Techniques for training an event classification by machine learning are explained below. The techniques described herein are based on a two-stage approach: In a first step (I), an anomaly detection is performed, operating on an image data set and detecting event candidates. In a second step (II), a model assumption of the event classification is determined based on the performance of the anomaly detection, i.e., the event classification is trained. For the classification of events, the event classification may then operate on the image data set or a further image data set, which may, for example, overlap with the image data set or be disjoint.

The present techniques are based on a weakly supervised learning step of anomaly detection. For example, first an unsupervised learning step without significant user interaction may be performed based on a training image data set for determining a model assumption of the anomaly detection. Techniques of autoregression may be used in this context, the training image data set not having any events or a particularly small/insignificant number of events. Subsequently, a supervised learning step may be performed just based on a comparatively small candidate subset of the image data set for determining the model assumption of the event classification. Such images of the image data set for which there is a particularly great probability of an event candidate being present can be included with preference in the candidate subset.

Such techniques as described above can be used in a wide variety of specialist areas. One specific specialist area in which the techniques described here can be used is cell biology. The area of cell biology is referred to below with reference to the figures. Corresponding techniques, however, can be readily applied to other specialist areas.

During data evaluation in applications of cell biology, it may be desirable to present cell cultures in a time-resolved manner, for example, in dependence on various stimuli. Image data sets can be obtained by phase-contrast microscopy. Phase-contrast microscopy is a non-invasive technique and allows the detection of events such as for example cell division (mitosis) or cell death (apoptosis). A fundamental challenge in phase-contrast microscopy is that of reliably and exactly segmenting outlines of cells. Because of the presence of image artefacts, the accuracy of previously known techniques according to reference implementations is comparatively limited; compare for instance M. Kaakinen et al., "Automatic detection and analysis of cell motility in phase-contrast timelapse images using a combination of maximally stable extremal regions and kalman filter approaches," in Journal of Microscopy 253 (2014) 65-67. Because of the restricted accuracy in the segmentation of the outlines of cells, there are in turn known techniques that avoid segmentation and detect events, such as for example mitosis or apoptosis, directly. Such techniques may be based on heuristically generated candidate regions. For example, there are known techniques in which a candidate event is detected in a light area that exceeds a certain threshold value size in an image; see for example S. Huh et al., "Automated mitosis detection of stem cell populations in phase-contrast microscopy images," in Trans. Medical Imaging 30 (2011) 586-596. In this case, it is possible to condition the images before the detection. For example, it becomes possible that each candidate event is represented by a histogram of oriented gradients (HoG), it being possible for the HoG to be preprocessed by a binary classification and smoothed by a conditional random field (CRF).

Such already known techniques may have the disadvantage that a fully supervised, extensive learning step is required. Since an image data set that represents a time-lapse of a cell culture typically consists of several hundred events, which in addition can occur simultaneously, the manual annotation in the course of such a learning step can be time-consuming and susceptible to errors. At the same time, in particular in the case of simultaneously occurring events, the manual annotation can be very laborious and require a high degree of expert knowledge.

In industrial process control, the automated detection of defects is important for ensuring the quality of products. Various non-invasive imaging techniques may be used. These include for example CT techniques, contrast-microscopy techniques, such as for example bright-field contrast, transmitted-light contrast, dark-field contrast, DIC contrast, phase contrast, etc., and also three-dimensional (3D) imaging techniques or deep-sensor techniques, such as for example stereoscopy, time-of-flight measurement (TOF), structured illumination, phase shifting, interferometer, etc. The choice of sensor depends on the type of defects to be detected. Factors that make the detection of defects more difficult are often on the one hand the high degree of variability in the distinctive forms of the defects and on the other hand the presence of complex object structures of the test piece and image artefacts. Learning-based methods can typically deliver reliable results in the detection of defects, but typically require a laborious, fully supervised training procedure, see for example S. Ravikumar, et al., "Machine learning approach for automated visual inspection of machine components," Expert Systems with Applications, 38 (2011) 3260-3266. By the techniques described herein, it is possible to reduce significantly the effort required for manual annotation in the course of a learning step.

The present techniques are based on a work sequence that allows a particularly high level of quality in the classification of events with little effort required for manual annotation. In various scenarios, events or event candidates are first detected by an anomaly detection. For this purpose, each event candidate is assigned a probability in a method of drawing lots, those images that have a high probability of showing an event preferably being assigned a greater probability. Images that form a candidate subset are selected from the resultant distribution of probabilities by the method of drawing lots. Based on these images of the candidate subset, the supervised learning step is performed. The event classification is trained based on the supervised learning step.

This work sequence is schematically illustrated in FIG. 1 in greater detail. The image data set 110 includes multiple images, which for example depict a cell culture as a function of time. The image data set 110 may be obtained from a phase-contrast microscope (not shown in FIG. 1).

Before the anomaly detection 121 is performed, the images of the image data set 110 may be processed to obtain a processed image data set 111. As graphically illustrated in FIG. 1, the processed image data set 111 may include difference images of consecutive images of the image data set 110. As an alternative or in addition, the background may be removed, and/or a binary conversion may be performed.

Subsequently, the anomaly detection 121 is performed. The anomaly detection 121 operates on the processed image data set 111. In a typical variation, a Collaborative Multi-Output Gaussian Process is used as the anomaly detection 121, see the aforementioned publication by V. T. Nguyen and E. Bonilla.

The anomaly detection 121 is characterized by a model assumption. For example, the model assumption of the anomaly detection 121 may be determined in a preceding step (not shown in FIG. 1), i.e., the anomaly detection 121 may be trained. It is possible that the model assumption of the anomaly detection 121 is determined based on an unsupervised or weakly supervised learning step that is based on a training image data set. For example, the training image data set can have no events. In such a way it is possible to use an autoregression technique for training the anomaly detection 121, see for example the aforementioned publication by Kandemir et al.

The anomaly detection 121 detects events. Since the anomaly detection 121 operates with a limited accuracy, the events may also be referred to as event candidates. Based on the performance of the anomaly detection 121, a candidate subset 122, which includes a limited number of images of the image data set 110, 111, is subsequently determined. Based on the images of the candidate subset 122, it is then possible to determine a model assumption 130 of a subsequent event classification 131 by a supervised learning step 125, i.e., it is possible to train the event classification. It may be desirable in this respect to choose the candidate subset 122 to be as small as possible (to keep down the effort required for manual annotation) but to choose it to be as large as necessary (to maintain a sufficient accuracy of the event classification). It may be desirable to determine the candidate subset 122 in a specific manner based on the performance of the anomaly detection 122.

There are in principle a wide variety of conceivable techniques for selecting the images for the candidate subset 122 based on the performance of the anomaly detection 121. For example, it is possible that the candidate subset 122 is determined based on a difference between a mean value and/or a variance and/or the Kullback-Leibler divergence of a prediction of the anomaly detection 121 for image features of a specific image and the image features of the specific image of the image data set 110, 111. Apart from such metrics, other metrics are also conceivable.

For example, according to the aforementioned publication by Kandemir et al., Sec. 2.2: Multioutput Gaussian process autoregression, the distance value $$TUV(x_n) = \|\mu(x_n) - y_n\|_2^2, \quad (1)$$

may be chosen as the mean value, where $\mu(x_n) = [\mu_1(x_n), \ldots, \mu_p(x_n)]$ are the predicted values of a data set $X = \{x_1, \ldots, x_N\}$ with n components and $y = \{y_1, \ldots, y_N\}$ are the corresponding real-value outputs.

This metric may also be supplemented by the predicted variance and/or Kullback-Leibler divergence. For example, an actual distribution may be determined for the observed features in the image data set 110, 111 $p_{true} = \aleph(y_n, \in I)$, where K denotes the Gaussian distribution, $\in$ is a small parameter and I is the identity matrix. This makes it possible to produce spikes at the points under consideration of the feature space. The Kullback-Leibler divergence between $p_{true}$ and the predicted distribution $p_{pred} = \aleph(\mu(x_n), \Sigma_n)$ is taken into account, where $[\Sigma_n]_{ii} = \sigma_i^2(x_n)$ is the predicted variance for output dimension i.

The corresponding metric is obtained as:

$$TUV(x_n) = \frac{1}{2}\left(\operatorname{tr}(\Sigma_n^{-1}\varepsilon I) + (\mu(x_n) - y_n)^T \Sigma_n^{-1}(\mu(x_n) - y_n) - \log\frac{|\varepsilon I|}{|\Sigma_n|}\right) \quad (2)$$

For the case where $\Sigma_n$ is the same for all instances, the metrics according to equations (1) and (2) deliver identical results.

For example, those images of the image data set 110, 111 that deliver the comparatively greatest results according to equations (1) or (2) can be assigned to the candidate subset 122. In this way, the candidate subset 122 can be determined strictly deterministically. However, it is also be possible that the candidate subset 122 is determined at least partly randomly. For example, it is possible that the candidate subset 122 is determined based on a method of drawing lots. The method of drawing lots can assign to each image of the image data set 110, 111 a probability, for instance according to $$P(C = x_n) = \frac{TUV(x_n)}{\sum_{j=1}^{N} TUV(x_j)}. \quad (3)$$

For example, those images of the image data set 100, 111 that deliver greater (smaller) results or greater (smaller) probabilities for the presence of an event according to the metrics based on equation (1) or (2) can be assigned a greater (smaller) probability.

Figure 2:
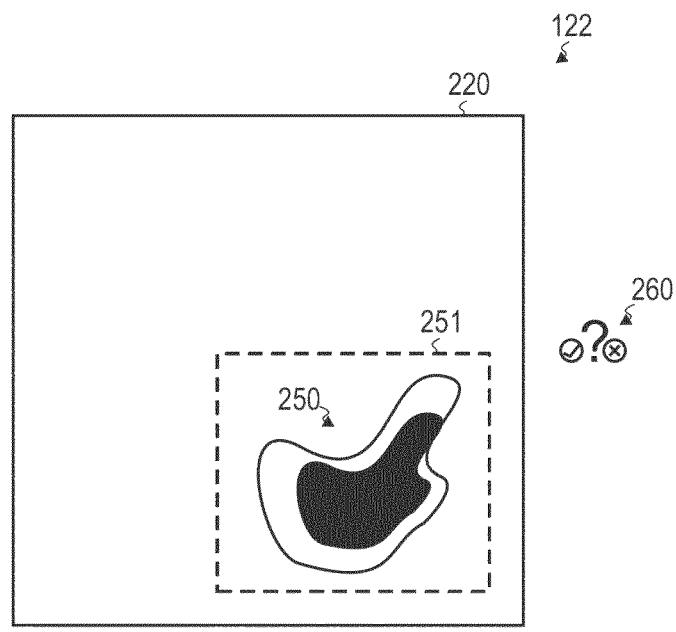
FIG. 2 schematically illustrates an image of an image data set in which an event candidate is marked for output by way of a user interface.

The performance of the supervised learning step 125 may include, for example, the sequential outputting of the images of the candidate subset 122 of the image data set 110, 111 by a user interface to a user. In FIG. 2, the output of an image 220 of the candidate subset 122 is illustrated by way of example. Also indicated is a yes/no inquiry 260 indicating whether an event 250 is present in the corresponding image. The corresponding event candidate 250 is marked in the output of the image 220. Since the event candidate 250 is already marked by the anomaly detection 121, the user does not have to annotate the spatial and/or temporal extent of the event 250 manually. The user can also assign a class or a type to the marked event 250.

Figures 3A, 3B:
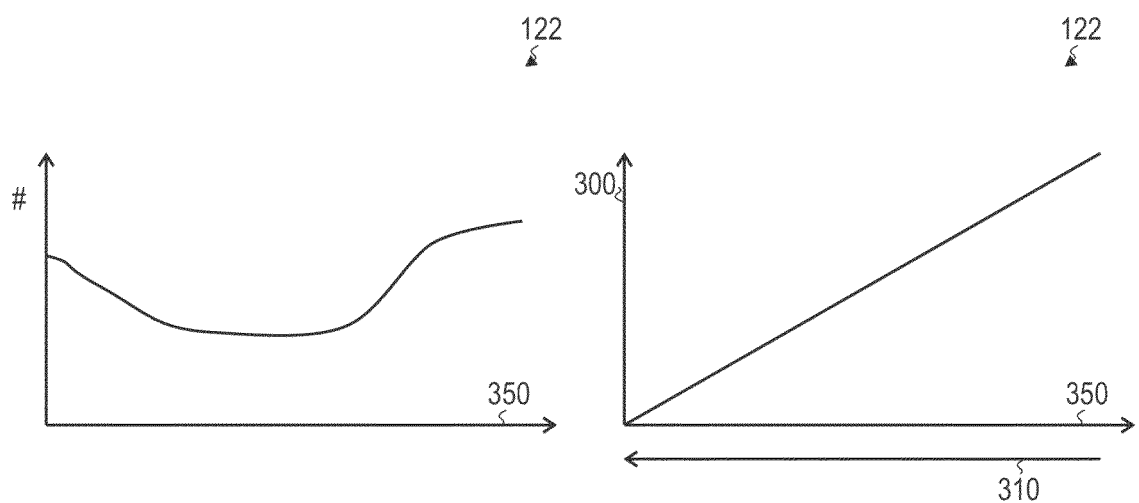
FIG. 3A illustrates events of a metric with which events are detected by the anomaly detection, whereby the results are indicative of the presence of an event in the corresponding images of the image data set.
FIG. 3B illustrates a probability that is assigned to various images, the probability being chosen in depending on the results of the metric according to FIG. 3A.

In FIG. 3A, the frequency of the various results of the metrics based on equations (1) or (2) is shown. It can be seen from FIG. 3 that a distribution of the probabilities 300 is obtained, the distribution being heavy-tailed in the example of FIG. 3. It may be desirable to take the entire result space into account during the training of the event classification. For this purpose, the probabilities 300 of the method of drawing lots for determining the candidate subset 122 for the various images 220 may for example be chosen as proportional to the result 350 (see FIG. 3B). Other dependences between the probability 300 and the result 350 of the anomaly detection 121 are also conceivable.

In principle, it is possible that the sequential outputting of the images of the candidate subset 122 takes place in a deterministic sequence. For example, those images 220 that deliver a greater result based on one of the metrics of the equations (1) or (2)—and consequently a greater probability 300—can be output before those images 220 that deliver a smaller corresponding result (as illustrated in FIG. 3B by the arrow). It is also possible that the images 220 of the candidate subset 122 are output in a random sequence.

Based on the supervised learning step, the event classification 131 can then be trained. This means that a model assumption 130 of the event classification 131 can be determined (see FIG. 1). In FIG. 1, the model assumption 130 is graphically illustrated as an a priori distribution of the event classification 131.

Subsequently, the event classification 131 for classifying events 250 may be performed in a further image data set (not shown in FIG. 1) based on the determined model assumption 130 of the event classification 131. In this case, the image data set 110, 111, from which the candidate subset 122 has been selected, may be different or disjoint, or else at least partially overlapping with the further image data set on which the event classification 131 operates. The event classification 131 can also be used for images that were not taken into account for the training.

The event classification 131 delivers as a result an assignment of various subsets 132-1, 132-2, 132-3 of the further image data set to various types of events, for example to: mitosis, apoptosis, and no event.

Figure 4:
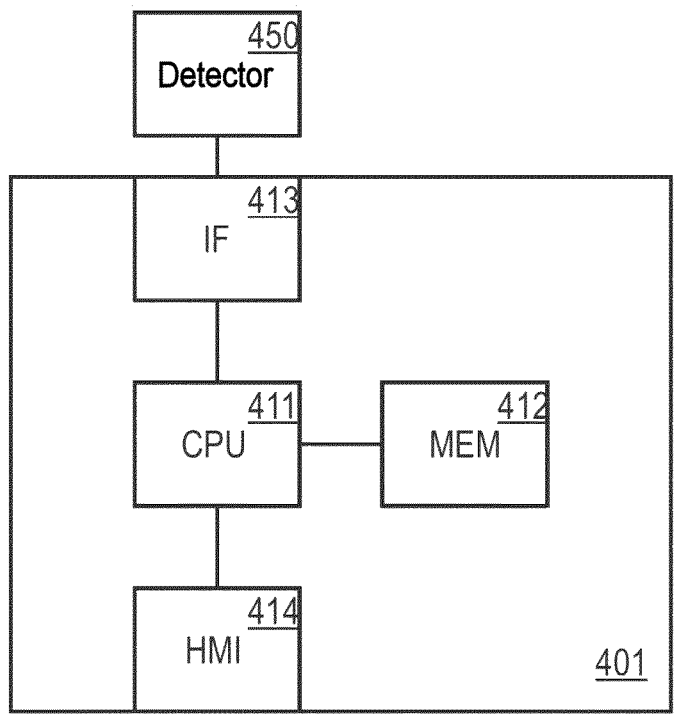
FIG. 4 schematically illustrates a device according to various exemplary embodiments of the present invention; the device being configured to carry out the workflow for the interactive event detection according to FIG. 1.

In FIG. 4, a device according to an exemplary embodiment is illustrated. The device 401 includes a processor 411, which is coupled to a nonvolatile memory 412, i.e., a non-transitory computer-readable storage medium. The device 401 also includes an interface 413. The interface 413 is configured to receive the image data set 110 from a detector, e.g., an optical recording unit 250, a microscope, or a phase-contrast microscope, and to store it in the memory 412 by the processor 411. The device 401 also includes a user interface 414. By the user interface 414, various images 220—for example with a marking 251 of an event candidate 250—are output to the user. It is also possible that the user indicates by the user interface 414 whether there is an event 250 in the corresponding output image 220. The corresponding inquiry may be implemented as a yes/no inquiry 260. The inquiry 260 may also require the input of the event type or other event properties, i.e., the annotation of the event class.

The processor 411 is configured to perform various techniques during the machine learning as described above and below. For this purpose, the memory may contain corresponding control data, which is executed by the processor 411.

Figure 5:
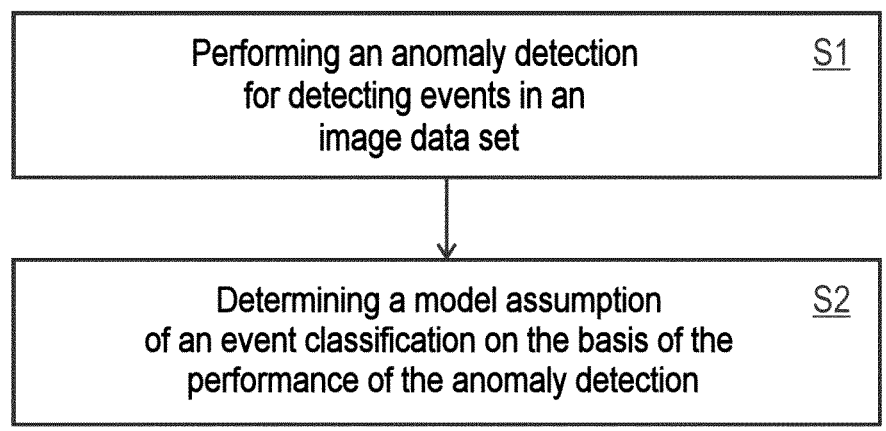
FIG. 5 is a flow diagram of a method for training an event classification by machine learning according to exemplary embodiments of the present invention.

For example, the execution of the control data that are stored in the memory 412 may have the effect that the processor 411 performs a method according to FIG. 5. In this case, first in step S1, the anomaly detection 121 is performed for detecting events in the image data set 110, 111.

For example, the anomaly detection 121 can be trained in advance (not shown in FIG. 5). For this purpose, a supervised or unsupervised learning step is performed for example. In this way it is possible to determine a model assumption of the anomaly detection 121 comparatively exactly.

This is followed by determining the model assumption 130 of the event classification 131 based on the performance of the anomaly detection in step S2. Step S2 corresponds to the training of the event classification 131.

Figure 6:
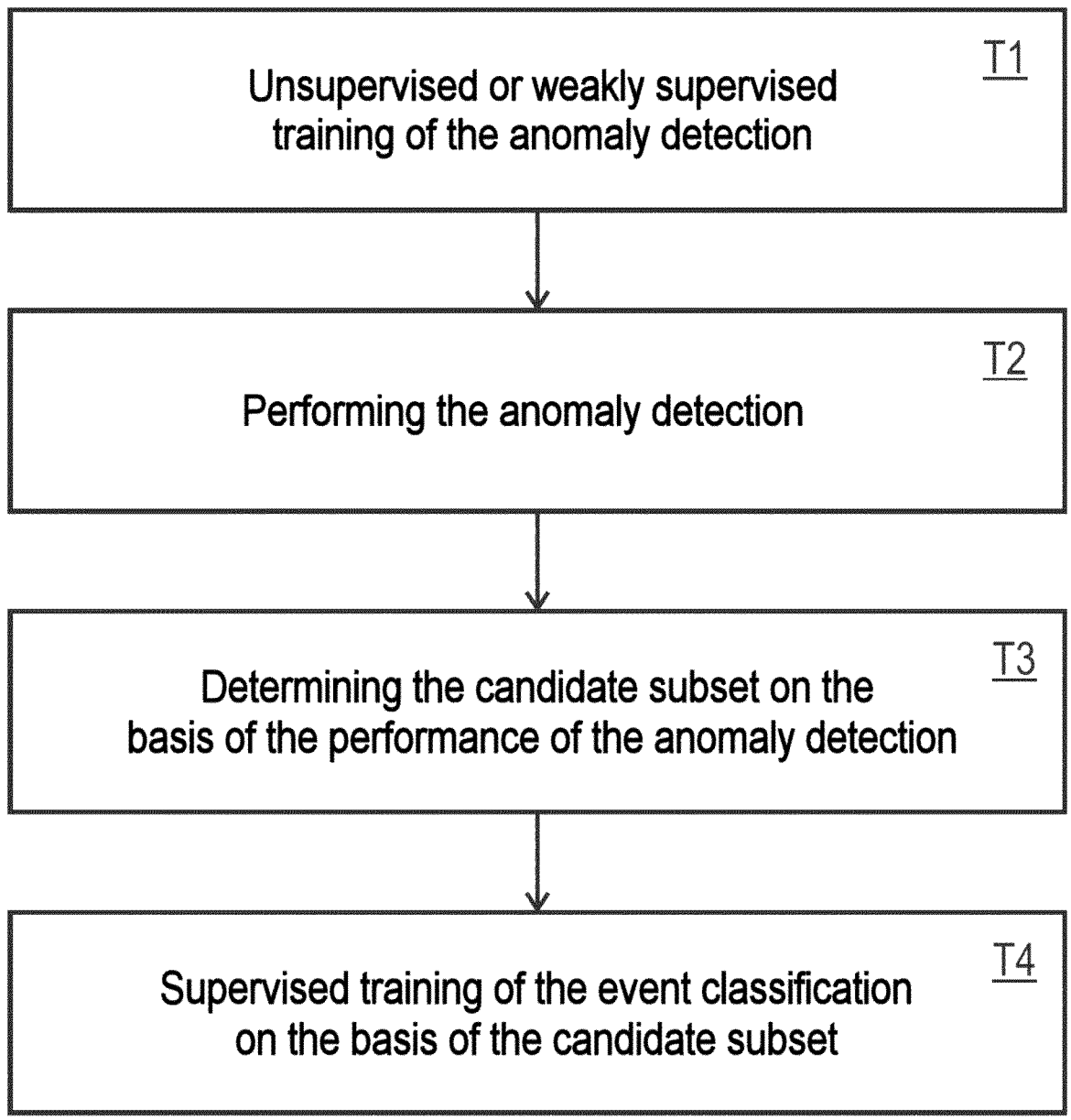
FIG. 6 is a flow diagram which illustrates details of the method of FIG. 5 with respect to the supervised training of the anomaly detection according to exemplary embodiments of the present invention.

The method of FIG. 5 is shown in FIG. 6 in greater detail. First, in step T1, there is the unsupervised or weakly supervised training of the anomaly detection. In this context, the model assumption of the anomaly detection may be determined. For example, an autoregression technique based on a training image data set that is free from events may be used in step T1.

This is followed by performing the anomaly detection in step T2. In this case, each image 220 of the image data set 110, 111 is assigned a result of the corresponding metric, for example based on the equations (1) or (2). The result is a measure of the probability that an event is present in the corresponding image 220.

Based on the performance of the anomaly detection in step T2, the candidate subset 122 is subsequently determined in step T3. The determination may be performed for example strictly deterministically or with a random element. In this case, the result of the corresponding metric can be taken into account, for example, based on the equations (1) or (2).

Then the training of the event classification 131 is performed based on the candidate subset 122 in step T4. The candidate subset 122 restricts the effort required for training the event classification.

Figure 7:
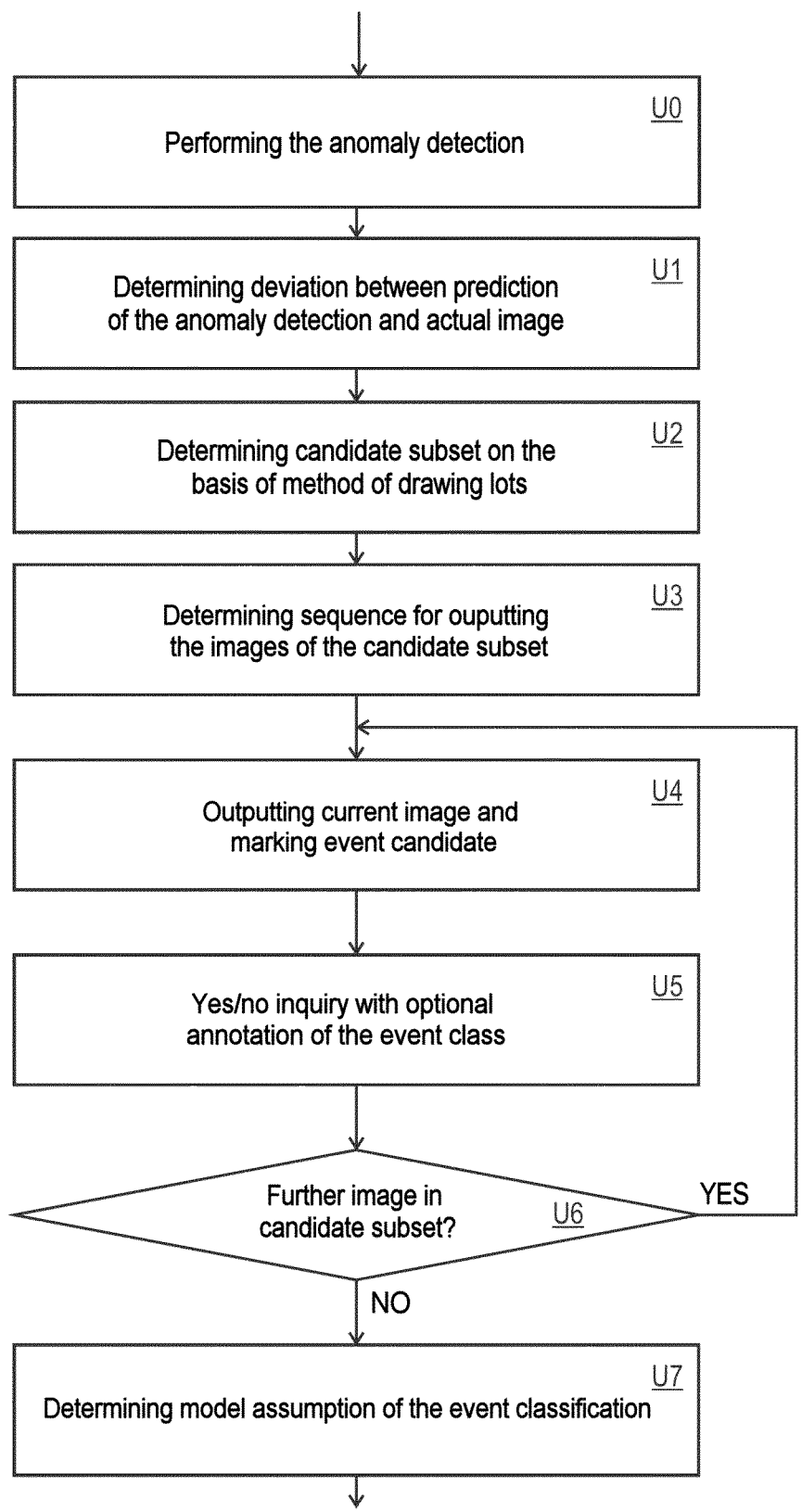
FIG. 7 is a flow diagram which illustrates details of the method of FIG. 6 according to exemplary embodiments of the invention.

In FIG. 7, a technique given by way of example for determining the model assumption of the event classification 131 is shown in greater detail. First, the anomaly detection is performed in step U0 and the deviation between the prediction of the anomaly detection 121 and the actual image 220 is determined in step U1, for example, based on one of the metrics as described in equations (1) or (2).

Then the determination of the candidate subset 142 is performed based on the method of drawing lots in step U2. In this case, each image 220 of the image data set 110, 111 is assigned a probability 300, which is based on the result of the anomaly detection 121 (see FIG. 3B).

This is followed by determining the sequence 310 for the outputting of the images 220 of the candidate subset in step U3. The sequence 310 may be strictly deterministic or else be determined with a random element.

Then, a current image 220 of the candidate subset 122 is output by the user interface 414 to the user. An event candidate 250 is optionally provided with a marking 251 in the output of the image 220 in step U4. This is followed in step U5 by the yes/no inquiry 260 as to whether the event candidate 250 actually represents an event or whether an event 250 was possibly not detected/marked.

It is subsequently checked whether a further image 220 is present in the candidate subset 122. If this is the case, the steps U4 to U6 are performed once again. Otherwise, the method is continued with step U7.

By performing the supervised learning step 125 (step U4 and U5), the ground truths can be gathered, and the model assumption of the event classification can be determined particularly exactly in step U7.

It can be seen from FIG. 7 that the candidate subset 122 is determined once in step U2 before performing the supervised learning step 125 (steps U4 and U5), and subsequently remains unchanged or static.

Figure 8:
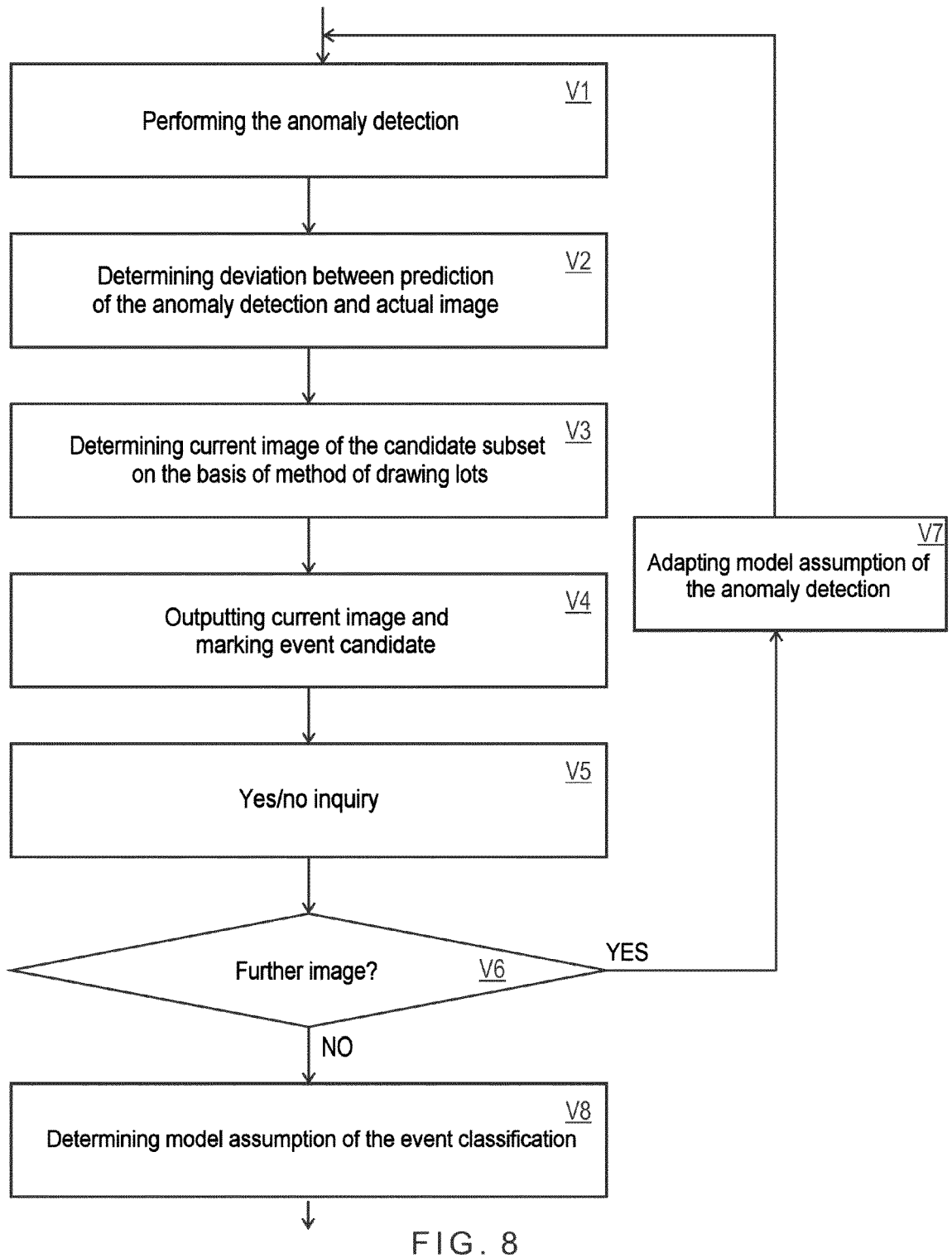
FIG. 8 is a flow diagram which illustrates details of the method of FIG. 6 according to exemplary embodiments of the invention.

With reference to FIG. 8, it is also possible that the candidate subset 142 is iteratively adapted during the supervised learning step 125 (steps V4 and V5). First, the anomaly detection is performed in step V1 and the deviation between the prediction of the anomaly detection 121 and the actual image 220 is determined in step V2, for example, based on one of the metrics as described in equations (1) or (2).

Then an individual, current image of the candidate subset 122 is determined based on the method of drawing lots in step V3 and is output by the user interface 414 in step V4. If present, the corresponding event candidate 250 is provided with a marking 251. The yes/no inquiry 260 as to whether the event candidate 250 actually depicts an event, or whether some other event is depicted in the corresponding image 220, is once again performed in step V5.

It is subsequently checked whether a further image 220 is to be output during the supervised learning step 125 (step V6). If this is the case, the model assumption of the anomaly detection 121 is adapted in step V7, based on the additionally learned ground truth from step V5. Then steps V1 to V5 are performed once again. In particular, the anomaly detection is performed once again based on the improved model assumption according to step V7.

If it is determined in step V6 that no further image 220 is output, i.e., if it is determined that the supervised learning step 125 has been completed, the model assumption of the event classification 131 is determined in step V8.

In the exemplary embodiment shown in FIG. 8, the manual annotation (steps V4 and V5) therefore serves both for training the anomaly detection 121 and for training the event classification 131.

Techniques of machine learning in which abnormalities are discovered during a weakly supervised or unsupervised preprocessing step that is based on an anomaly detection have been summarized above. In this way, a correspondingly trained event classification can be performed in a subsequent step. The effort required for manual annotation can in this way be reduced, since corresponding images just have to be globally annotated with or without an event. The temporal/spatial extent of an event is already determined by the preprocessing step or the anomaly detection, so that the user just has to annotate the presence of events and optionally the event class. This allows the effort required for manual annotation to be reduced. The comparison with various reference implementations, for example techniques of active learning—which are likewise used for reducing the effort required for manual annotation—shows that the techniques described herein can achieve more accurate results while requiring less effort for manual annotation.

By the techniques described herein, it is therefore possible for example to reliably detect cell events during phase-contrast microscopy of a cell culture with a greatly restricted supervised learning step. An anomaly detection is used for this purpose. A particularly steep learning curve can be achieved if the anomaly detection is implemented based on the Collaborative Multi-Output Gaussian Process. By using a random element for determining a candidate subset, based on which the supervised learning step is performed, a comparatively steep learning curve for the training of the event classification can be achieved. This is the case because the available result space of the anomaly detection can be used both across its range and at the extreme values for training the event classification.

The greater accuracies that can be achieved with a comparatively limited supervised learning step make a significant improvement possible in the image-based analysis of cell cultures. For example, the corresponding techniques can be implemented within annotation software that is used by biologists. In this way, a presorting of the positions that have to be annotated manually in the course of the supervised learning step can be performed. In this way, the required effort on the part of a user or expert can be greatly reduced.

It goes without saying that the features of the exemplary embodiments and aspects of the invention described above can be combined with one another. In particular, the features can be used not only in the combinations described but also in other combinations or on their own without departing from the scope of the invention.

Thus, it is understood that the foregoing description is that of the exemplary embodiments of the invention and that various changes and modifications may be made thereto without departing from the spirit and scope of the invention as defined in the appended claims.

What is claimed is:

1. A method for training an event classification by machine learning, the method comprising:
    determining a model assumption of the event classification by iteratively adapting a candidate subset during a supervised learning step, wherein the determining of the model assumption of the event classification comprises:
    (a) performing an anomaly detection based on the model assumption to detect events in an image data set;
    (b) determining the candidate subset with the anomaly detection;
    (c) selecting a current image of the candidate subset;
    (d) performing the supervised learning step based on the current image of the candidate subset of the image data set with a user interface;
    (e) adapting the model assumption based on the supervised learning step; and
    (f) repeating steps (a) to (e) according to the adapted model assumption of step (e).

2. The method as claimed in claim 1, further comprising:
    determining the candidate subset of the image data set based on a difference between a mean value of a prediction of the anomaly detection for image features of a specific image and the image features of the specific image.

3. The method as claimed in claim 1, further comprising:
    determining the candidate subset of the image data set based on a Kullback-Leibler divergence between a prediction of the anomaly detection for image features of a specific image and the image features of the specific image.

4. The method as claimed in claim 1, further comprising:
    determining the candidate subset of the image data set based on a method of drawing lots, which assigns a probability to each image of the image data set.

5. The method as claimed in claim 4, further comprising:
    for each image of the image data set, determining the corresponding assigned probability of the method of drawing lots based on at least one element that is selected from the group consisting of:
    a difference between a mean value of a prediction of the anomaly detection for image features of the corresponding image and the image features of the corresponding image, and
    a Kullback-Leibler divergence between a prediction of the anomaly detection for image features of the corresponding image and the image features of the corresponding image.

6. The method as claimed in claim 1, further comprising:
    statistically determining the candidate subset before the supervised learning step.

7. The method as claimed in claim 1, wherein the performing of the supervised learning step comprises:
    sequentially outputting the images of the candidate subset of the image data set by the user interface; and
    for each image of the candidate subset of the image data set, inquiring by the user interface whether there is an event in the corresponding image.

8. The method as claimed in claim 7, wherein the sequential outputting of the images of the candidate subset of the image data set comprises:
    for at least some of the images of the candidate subset of the image data set, marking an event candidate in the output of the respective image.

9. The method as claimed in claim 7, wherein the inquiry as to whether an event is present is a yes/no inquiry.

10. The method as claimed in claim 7, wherein the sequential outputting of the images of the candidate subset of the image data set is performed in a random sequence.

11. The method as claimed in claim 1, further comprising:
    performing an unsupervised or weakly supervised learning step based on a training image data set for determining a model assumption of the anomaly detection.

12. The method as claimed in claim 1, further comprising:
    performing the event classification for classifying events in a further image data set based on the determined model assumption of the event classification,
    wherein the image data set and the further image data set at least partially overlap or are disjoint.

13. The method as claimed in claim 1, wherein the events are selected from the group consisting of: a mitosis of a cell, an apoptosis of a cell, and a defect of a test piece.

14. The method as claimed in claim 1, further comprising:
    obtaining the image data set from a detector selected from the group consisting of: a computed tomography scanner, an optical phase-contrast microscope, an optical microscope, an optical microscope with contrast imaging, an optical microscope with structured illumination, a 3D detector, a time-of-flight detector, a stereoscopic detector, a phase-shifting detector, and an interferometer.

15. The method as claimed in claim 1, wherein the current image of the candidate subset is selected by drawing lots.

16. A method for training an event classification by machine learning, the method comprising:
    performing an anomaly detection for detecting events in an image data set;
    determining a model assumption of the event classification based on the performing of the anomaly detection, wherein the determining of the model assumption of the event classification comprises performing a supervised learning step based on a candidate subset of the image data set by a user interface, and wherein the performing of the supervised learning step comprises (a) sequentially outputting the images of the candidate subset of the image data set by the user interface, and (b) for each image of the candidate subset of the image data set, inquiring by the user interface whether there is an event in the corresponding image;
    iteratively adapting the candidate subset during the supervised learning step; and
    determining a sequence with which the sequential outputting of the images of the candidate subset of the image data set takes place based on elements that are selected from the group consisting of:
    a difference between a mean value of a prediction of the anomaly detection for image features of a specific image and the image features of the specific image; and
    a Kullback-Leibler divergence between a prediction of the anomaly detection for pixel values of a specific image and the image features of the specific image.

17. An apparatus for training an event classification by machine learning, the apparatus comprising:
    a memory configured to store an image data set;
    a processor configured to:
    determine a model assumption of the event classification by iteratively adapting a candidate subset during a supervised learning step, wherein, to determine the model assumption of the event classification, the processor is configured to:
(a) perform an anomaly detection based on the model assumption to detect events in an image data set;
(b) determine the candidate subset with the anomaly detection;
(c) select a current image of the candidate subset;
(d) perform the supervised learning step based on the current image of the candidate subset of the image data set with a user interface;
(e) adapt the model assumption based on the supervised learning step; and
(f) repeat steps (a) to (e) according to the adapted model assumption of step (e).

18. The apparatus as claimed in claim 17, further comprising a phase-contrast microscope.

19. The apparatus as claimed in claim 17, wherein the current image of the candidate subset is selected by drawing lots.

* * * * *